United States Patent [19]

Mackal

[11] Patent Number: 5,135,025
[45] Date of Patent: Aug. 4, 1992

[54] ARTICULATED ORAL INFLATION VALVE

[76] Inventor: Glenn H. Mackal, 2586 25th Ave. N., St. Petersburg, Fla. 33713

[21] Appl. No.: 725,697

[22] Filed: Jul. 3, 1991

[51] Int. Cl.$^5$ ............................................. F16K 15/20
[52] U.S. Cl. ................................. 137/541; 137/223; 251/86
[58] Field of Search ................... 137/541, 223; 251/86

[56] References Cited

U.S. PATENT DOCUMENTS

| | | | |
|---|---|---|---|
| 903,841 | 11/1908 | Cohn | 137/541 |
| 2,154,255 | 4/1939 | Williams | 137/223 |
| 3,351,081 | 11/1967 | Bogossian et al. | 137/541 |
| 3,396,743 | 8/1968 | Mackal et al. | 251/86 |
| 3,590,851 | 7/1971 | Bogossian et al. | 137/223 |
| 4,506,695 | 3/1985 | Kuypers | 137/223 |
| 4,836,235 | 6/1989 | Pagani | 137/223 |

Primary Examiner—A. Michael Chambers
Attorney, Agent, or Firm—Joseph C. Mason, Jr.; Ronald E. Smith

[57] ABSTRACT

A check valve for use in an oral inflation valve has an articulated connection between the valve head and valve stem. The valve stem has a trailing end in the form of a spherical ball and a socket carried by the valve head rotatably receives the ball so that the valve head may skew about an axis of articulation when the valve is open. The trailing end of the valve body is flat and the mating surface of the valve head is flat so that the head seats squarely on the seat when the valve is in repose. The flat trailing end of the valve body is coincident with the axis of articulation. In a second embodiment, the ball and socket are not spherical, but are of frusto-conical configuration to facilitate assembly of the device.

8 Claims, 2 Drawing Sheets

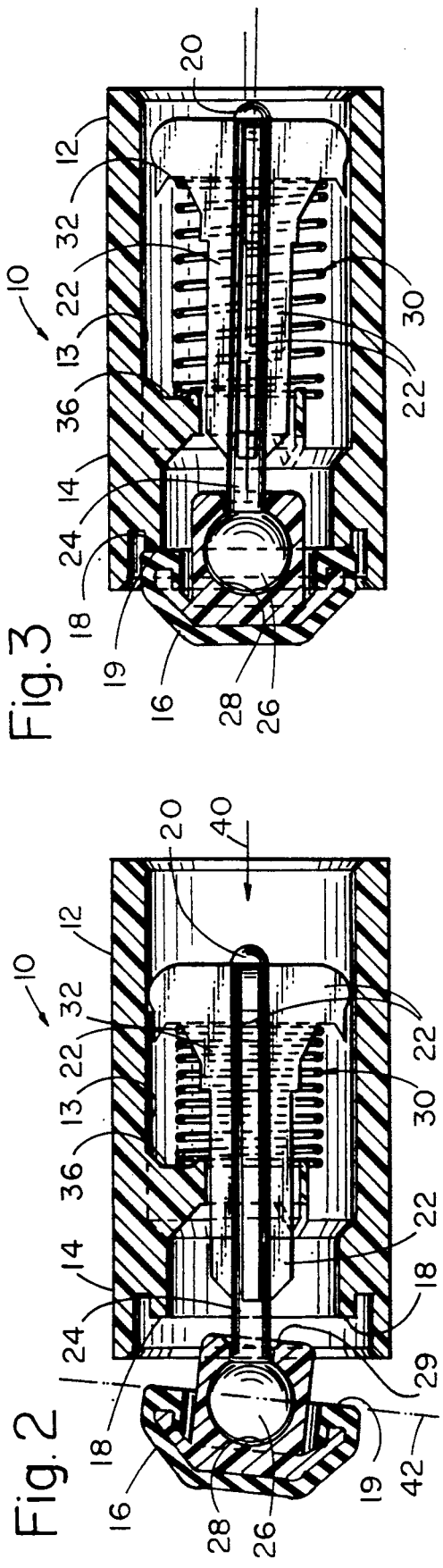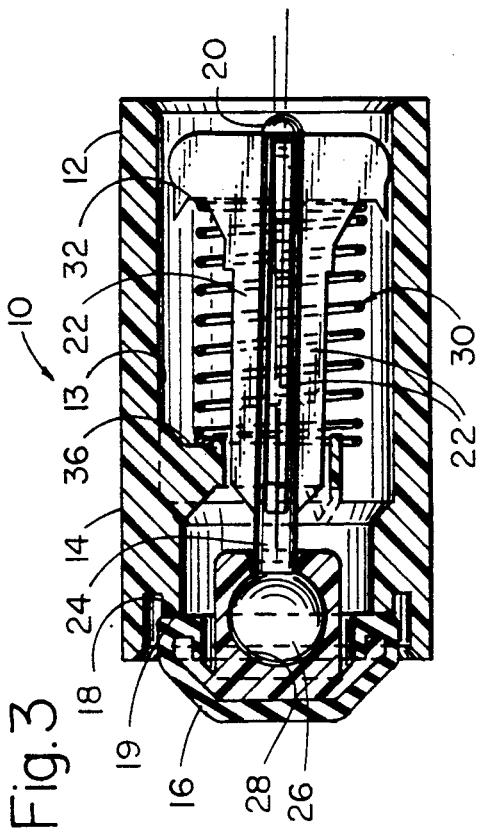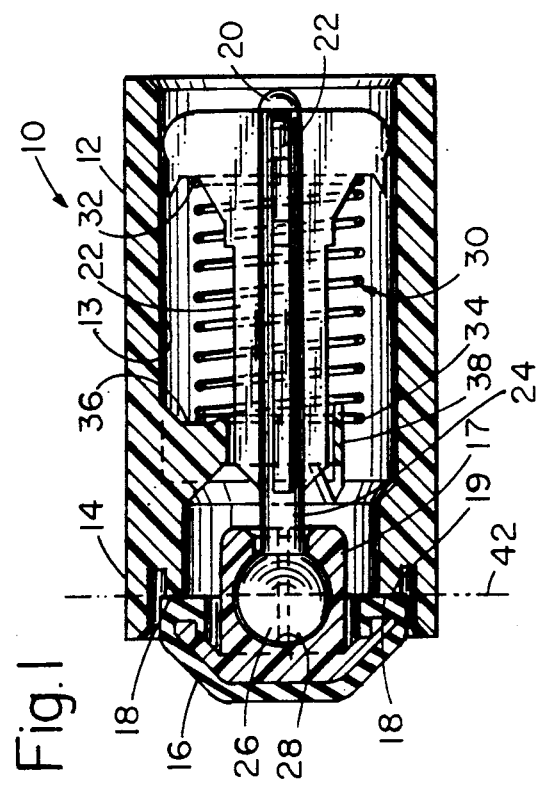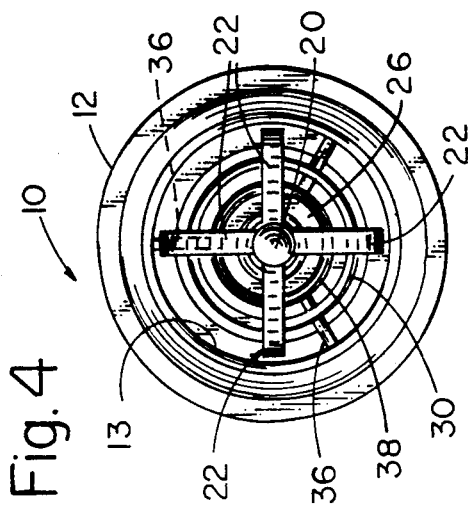

ARTICULATED ORAL INFLATION VALVE

TECHNICAL FIELD

This invention relates, generally, to oral inflation check valves of the type positioned in inflation tubes of orally inflatable articles such as life vests. More particularly, it relates to such a valve having an articulated joint between the valve stem and the valve head.

BACKGROUND ART

An oral inflation valve similar to the novel valve disclosed hereinafter is shown in U.S. Pat. No. 4,305,425 to Mackal et. al. That valve includes a disc-shaped valve head that is rigidly connected to a valve stem and which seats on an annular, beveled surface. Although that early valve adequately performs its intended function, the rigid interconnection between head and stem often results in the head not squarely abutting its seat. This means that air will leak from the inflated article. Quality control procedures performed on the rigidly built valves of the prior art have shown that an unacceptably high percentage of them do leak. More precisely, the leakage rate of those valves is fifty five percent.

These rigid valves of the prior art are also subject to two additional drawbacks: When air is introduced into the valve as the article is being inflated, the stem is axially displaced as desired but it skews wildly. This skewing often contributes to the failure of the valve head to resume its fully seated position after the article has been inflated. Secondly, the skewed valve head often blocks, at least to some extent, air flow into the article.

What is needed, then, is a valve construction that enables the valve head to be squarely seated after each inflation so that the fifty five percent leakage rate of the present inflation valves can be drastically reduced. The needed construction would also eliminate valve stem skewing and would allow a better flow rate of air through the valve during inflation, but the prior art, taken as a whole, neither teaches nor suggests how the art could be advanced.

DISCLOSURE OF INVENTION

In a first embodiment, the valve stem of the improved check valve terminates in a spherical member which serves as the ball in a ball and socket joint. The complementally formed socket that rotatably receives the ball is formed at the center of a valve head. Accordingly, the valve head is articulated to the stem and freely pivots with respect thereto when unseated. The novel seat of the improved valve is flat so that the flat surface of the valve head abuts squarely against the seat when the valve is in repose. Thus, the annular zone of contact between head and seat is a narrow band and the pressure between valve head and seat is evenly distributed therethroughout. More importantly, the articulated joint insures that the valve head will adjust itself as needed to seat squarely in a non-leaking configuration when the inflation process has ended. Empirical tests of the novel valve have shown that its leakage rate is less than 2%.

A spider or stem-centering device is also provided to maintain the stem in the center of the valve body during the inflation. This elimination of skewing also serves to insure better seating of the valve at the conclusion of the inflation process. The articulation between stem and valve head also results in a greater rate of air flow into the inflatable article, as will become more clear as this description proceeds.

A primary object of this invention is to advance the art of oral inflation check valves generally by providing an articulated valve assembly.

A more specific object is to provide an oral inflation valve that is substantially less likely to leak air vis a vis the oral inflation valves of the prior art.

These and other objects and advantages of the invention will become apparent as this description proceeds.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which:

FIG. 1 is a longitudinal sectional view of the novel valve element when in its closed position, certain parts thereof being shown in elevation;

FIG. 2 is a view similar to FIG. 1, but with the valve in its open configuration;

FIG. 3 is a view similar to FIG. 1, but showing the valve element in a valve-closed position and showing the valve stem in a skewed configuration;

FIG. 4 is an end view of the valve element of FIG. 1;

Similar reference numerals refer to similar parts throughout the several views of the drawings.

BEST MODES FOR CARRYING OUT THE INVENTION

Figure 6:
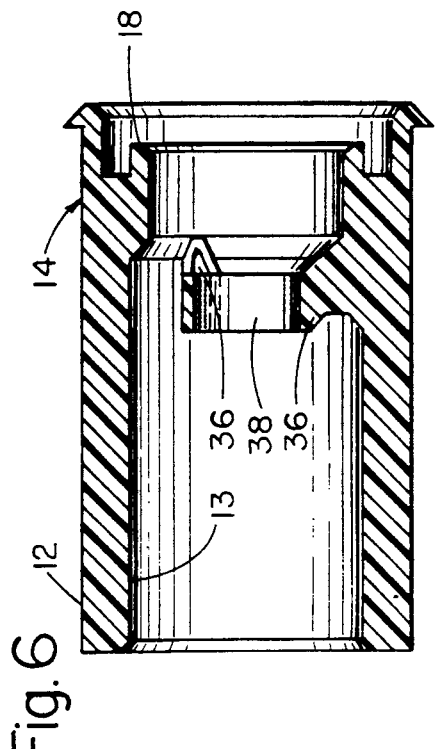
FIG. 6 is a longitudinal view of the valve body to better depict the stem centering means or spider.

Referring now to FIG. 1, it will there be seen that an exemplary embodiment of the novel check valve is denoted as a whole by the reference numeral 10. Valve 10 has outer or leading end 12, inner or trailing end 14, and is centrally bored as at 13; the outer end of bore 13 is in open fluid communication with ambient and the reduced diameter inner end thereof, when the valve is open, is in open fluid communication with the interior cavity of an inflatable article, not shown.

When valve 10 is in repose as depicted in FIG. 1, annular flat wall 19 at the leading end of plastic valve head 16 seats squarely against annular flat wall 18 of the valve (wall 18 lying in a plane transverse to the longitudinal axis of symmetry of the valve), but when the valve is not in a state of equilibrium, valve head 16 is longitudinally spaced from seat 18 and may be disposed in a skewed orientation with respect thereto as depicted in FIG. 2. Interestingly, the greater the amount of skew, the greater the rate of air flow into the inflatable article. The amount of skew depicted in FIG. 2 is nominal.

Longitudinal displacement of head 16 is caused by longitudinal displacement of button 20 that is integrally formed with valve stem 22 as shown. Said displacement of button 20 is caused by air pressure supplied by the individual performing the oral inflation. Stem 22 has a reduced diameter extension 24, of round cross section, that terminates in an integral spherical member 26 that is rotatably received within complementally formed socket 28. Socket 28 is formed in base 17 of head 16. Stem 22 has a cruciform configuration as best depicted in FIG. 4.

Figure 5:
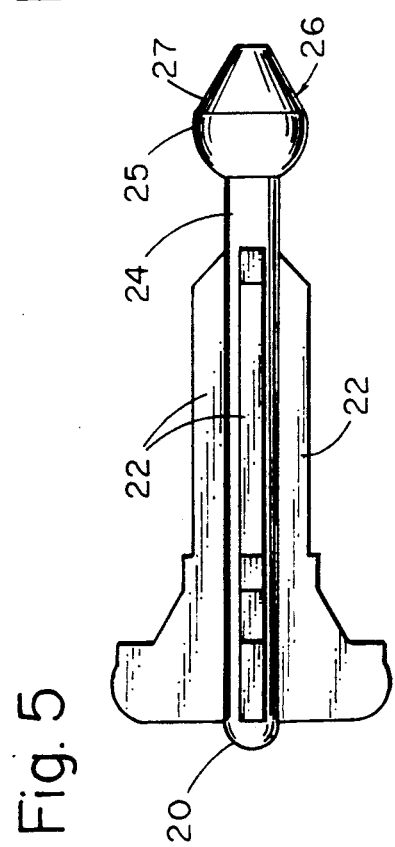
FIG. 5 is a side elevational view of an alternative embodiment of the novel stem.

In an alternative embodiment, (FIG. 5) member 26 has a hemispherical part 25 and a frusto-conical part 27. Part 25 provides the needed articulation; part 27 is provided to facilitate assembly of the device, i.e., the cone shape of 27 enables it to be easily driven into socket 28 through its reduced diameter opening 29 (see FIG. 2).

Figure 7:
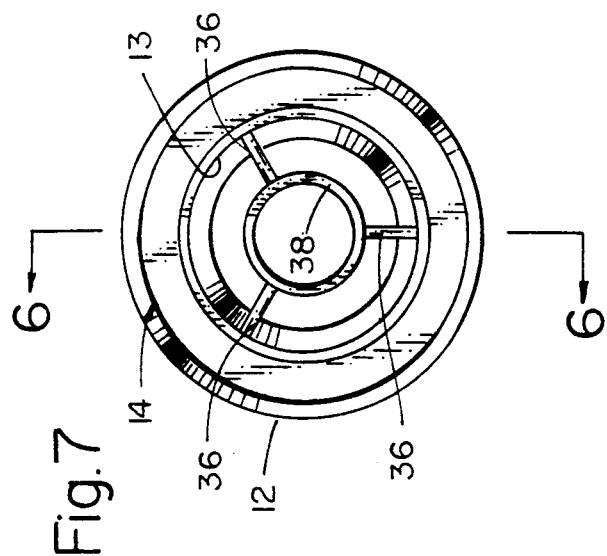
FIG. 7 is an end view of the structure shown in FIG. 6.

Coil compression spring 30 axially receives stem 22 and maintains the valve in its equilibrium state as shown in FIG. 1 when no air is being introduced into the inflatable article. The outer or leading end 32 of spring 30 abuts button 20 as shown. The inner or trailing end 34 of said spring is supported and held against displacement by plural radially inwardly extending fingers or spider means, collectively denoted 36. The fingers are integral with the valve body as shown and extend as shown into central bore 13 thereof; in the embodiment shown, there are three fingers 36, as best shown in FIGS. 4 and 7. They are joined at their radially innermost ends by ring 38 which is concentric with the main valve body. Thus, when air is introduced into valve 10 as suggested by arrow 40 in FIG. 2, spring 30 is compressed between fingers 36 and button 20.

The fingers or spider means also serve as the means for maintaining valve stem 22 in its axially centered position at all times, i.e., said spider means prevents skewing of said valve stem when it is axially displaced during the inflation process. This also insures that the stem will return to its seat in a square, non-leaking fashion. Prior art, uncentered stems sometimes skew so greatly that they cannot return to their proper seat at all.

Reference numeral 42 in FIG. 1 indicates a transverse plane passing through the center of spherical member 26. That plane is also coplanar with annular seat 18 and the flat annular wall 19 of valve head 16. The coplanar relationship between seat 18 (and valve head sealing surface 19) and the center of member 26 when the valve 10 is in repose is an important feature of this invention. Moreover, sealing surface 19 and plane 42 are coplanar at all times, not just when valve 10 is in repose.

Plane 42 may also be considered a line, or more particularly, an axis of articulation about which base 17 having socket 28 formed therein rotates with respect to ball member 26. It should be observed that in FIG. 2, axis 42 remains coincident with annular flat wall 19 of valve head 16 even when head 16 is skewed with respect to stem 22 as shown. It is this coincidence of the axis of articulation 42 and the sealing surface 19 of valve head 16 that lies at the heart of this invention.

It should therefore be understood that the ball and socket arrangement shown in the figures could be reversed, i.e., a base having a socket formed therein could be provided at the trailing end of stem 22, and valve 16 could be formed integrally with a ball member rotatably received therein.

The novel articulated valve head represents a significant advance in the art. Accordingly, the invention is new and useful. Moreover, it was not obvious to those of ordinary skill in the art at the time it was made, in view of the prior art, taken as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A check valve, comprising:
 a valve body of generally tubular configuration;
 said valve body having a leading end and a trailing end;
 a longitudinally extending central bore formed in said valve body, said central bore having cylindrical side walls;
 a flat, annular in configuration valve seat formed in said trailing end of said valve body, said valve seat being disposed transversely to a longitudinal axis of symmetry of said valve body;
 a valve head;
 said valve head having a flat, annular leading end that sealingly engages said annular valve seat when the valve is in an equilibrium state;
 a valve stem;
 an articulated joint for coupling together a trailing end of said valve stem and said valve head;
 a valve button secured to a leading end of said valve stem;
 a plurality of circumferentially spaced, radially inwardly extending finger members being formed in one piece with said side walls;
 said finger members being disposed near the trailing end of said valve body;
 means for biasing said valve button and hence said stem and said valve toward said leading end of said valve to that said flat leading end of said valve head seats squarely against said valve seat when no fluid is flowing through said check valve;
 said means for biasing said valve button including a spring, said spring having a leading end disposed in abutting relation to said valve button and said spring having a trailing end disposed in abutting relation to said plurality of finger members;
 said valve button having a diameter slightly less than the diameter of said central bore and said valve button being slidable within said central bore;
 a ring that joins together the radially innermost ends of said finger members, said ring being concentric with said valve body; and
 said valve stem extending through said ring;
 whereby said valve stem is centered with respect to said valve body when said spring is compressed and when said spring is in repose.

2. The valve of claim 1, wherein said articulated joint includes a socket member formed within said valve head and a spherical ball member formed in a trailing end of said valve stem, said ball member being rotatably received within said socket member.

3. The valve of claim 2, wherein said valve stem is slideably disposed within said valve body and wherein said finger members maintain said valve stem against skewing with respect to an axis of symmetry of said valve body when said valve stem is axially displaced upon flow of fluid through said valve body.

4. The valve of claim 1, wherein said articulated joint includes a socket member formed within said valve head and a frusto-conical in configuration member formed in a trailing end of said valve stem, said frusto-conical in configuration member being rotatably received within said socket member.

5. An oral inflation valve, comprising:
a tubular valve body having a longitudinally extending central bore formed therein;
a valve stem slidably disposed within said valve body;
spider means for positioning and maintaining a trailing end of said valve stem in a position coincident with a longitudinal axis of symmetry of said valve body even when said valve stem is axially displaced;
said spider means comprising a plurality of radially inwardly extending finger members formed in one piece with interior cylindrical sidewalls of said valve body near a trailing end of said valve body;
a ring for joining together radially innermost ends of said finger members, said ring axially receiving said valve stem;
a valve head rotatably secured to a trailing end of said stem, said valve head being free to skew in any direction with respect to said stem when said stem is axially displaced in response to fluid flow through said valve body;
an annular valve seat formed in a trailing end of said valve body, said valve seat being transverse to a longitudinal axis of said valve body;
a valve button carried by a leading end of said valve stem;
said valve button having a diameter slightly less than the diameter of said central bore;
biasing means urging said valve button toward said leading end of said stem so that said valve head seats against said valve body when the oral inflation valve is in repose; and
said valve body having a leading end that is in open communication with the ambient environment so that air may be blown into said valve at said open end to unseat said valve head from said valve seat.

6. The valve of claim 5, wherein said biasing means is positioned between said spider means and said valve button.

7. The valve of claim 6, further comprising a spherical socket means formed in said valve head and a spherical ball member formed in a trailing end of said valve stem so that a ball and socket joint joins together said valve head and said valve stem.

8. The value of claim 6, further comprising a frusto-conical member formed in a trailing end of said valve stem and a complementally formed socket means formed in said valve head to provide an articulated joint between said valve head and said valve stem that is easy to assemble.

* * * * *